United States Patent [19]

Rajchman

[11] 3,753,247

[45] Aug. 14, 1973

[54] ARRAY OF DEVICES RESPONSIVE TO DIFFERENTIAL LIGHT SIGNALS

[75] Inventor: Jan Aleksander Rajchman, Princeton, N.J.

[73] Assignee: RCA Corporation, New York, N.Y.

[22] Filed: Apr. 22, 1971

[21] Appl. No.: 136,328

[52] U.S. Cl. ..... 340/173 LS, 340/173 FF, 307/238, 250/220 M

[51] Int. Cl. ..... G11c 11/42, G11c 11/40

[58] Field of Search ..... 340/173 FF, 173 LM, 340/173 LT; 307/238, 279; 250/220 M

[56] References Cited

UNITED STATES PATENTS

| | | | |
|---|---|---|---|
| 3,506,837 | 4/1970 | Majima | 250/220 M |
| 3,454,414 | 7/1969 | Andes et al. | 340/173 LM |
| 3,488,636 | 1/1970 | Dyck | 340/173 LM |
| 3,526,880 | 9/1970 | Filippazzi | 340/173 LM |
| 3,566,371 | 2/1971 | Barnes | 340/173 LM |
| 3,624,419 | 11/1971 | Kosonocky | 307/279 |

*Primary Examiner*—Stanley M. Urynowicz, Jr.
*Attorney*—H. Christoffersen

[57] ABSTRACT

An array of memory elements is disclosed in which each memory element includes a bistable circuit having a differential input circuit including a pair of spaced photosensors. The bistable circuit is set to one or the other of its two states in accordance with which photosensor of the pair receives the greater amount of input light. The pairs of photosensors are arranged in interlaced herringbone fashion in the array so that every photosensor of a pair is positioned equidistant from the two photosensors of one adjacent pair of photosensors. The memory elements in the array may be densely packed because the effect of input light intended for one photosensor of a pair which may spill over to the equidistant photosensors of the adjacent pair of photosensors is cancelled in the differential input circuit connected to the adjacent pair of photosensors.

7 Claims, 6 Drawing Figures

INVENTOR.
JAN A. RAJCHMAN
BY
Carl V. Olson
ATTORNEY

INVENTOR.
JAN. A. RAJCHMAN
BY
Carl V. Olson
ATTORNEY

ARRAY OF DEVICES RESPONSIVE TO DIFFERENTIAL LIGHT SIGNALS

BACKGROUND OF THE INVENTION

In an article, "An Optical Read-Write Mass Memory" by J. A. Rajchman appearing in *Applied Optics*, Vol. 9, p. 2269, and an article, "Optics for a Read-Write Holographic Memory" by W. C. Stewart and L. S. Cosentino appearing at page 2271 of the same periodical, a computer memory system is described which includes a randomly and electrically accessible semiconductor "page" memory. The semiconductor page memory includes a planar array of electrically-accessible flip-flops for storing a corresponding number of binary information bits. In addition, each flip-flop is provided with a photosensor by which the flip-flop can be set in response to received light, and is provided with a light valve controlled by the state of the flip-flop. A laser light source, a light deflector and holographic optics are provided to create a hologram of the array of light valves at any one of many small areas on an erasable holographic storage medium. Subsequently, the hologram can be illuminated to recreate and project the image of the array of light valves onto the array of photosensors to return the information to the flip-flops in the semiconductor page memory. In this way, the semiconductor page memory serves as a page-at-a-time electrical input-output unit for a great many pages of information stored optically on the erasable holographic storage medium.

In the described memory system, the information read out from the holographic storage medium is directed as a pattern of binary light spots to the array of photosensors in the semiconductor page memory to set the flip-flops to states representing the information. This pattern of light is relatively weak, and the light spots are not as sharp and well-defined as can be desired. This gives rise to a need for high sensitivity and discrimination in the photosensor-controlled flip-flops.

It has therefore been proposed to construct each flip-flop with two photosensors connected in a balanced or differential manner so that the flip-flop is set to a 1 state when input light impinges on one photosensor, and is set to a 0 state when the input light impinges on the other photosensor. Such a "Balanced Optically-Settable Memory Cell" is described in a patent application Ser. No. 81,966 filed on Oct. 19, 1970, now U.S. Pat. No. 3,624,419 issued on Nov. 30, 1971 for Walter F. Kosonocky and assigned to the assignee of the present application. The circuit includes two cross-coupled insulated-gate, field-effect transistors, and two photodiodes connected in a balanced fashion to control the states of the transistors in response to the differential effect of two input light signals. The balanced circuit is an order of magnitude more sensitive than known prior arrangements operating on the presence or absence of a single input light signal.

The binary light spots directed from the holographic recording medium to the photosensors are somewhat diffused or spread out so that some light intended for one photosensor may impinge on an adjacent photosensor. When the two photosensors are a pair providing inputs for one bistable circuit, the spillover of light from one photosensor to the other one of the pair is a common mode "noise" which is cancelled by the balanced or differential nature of the circuit. However, the spillover of light to adjacent photosensors of other pairs may interfere with the correct operation of the system and has required the photosensors and bistable circuits to be spaced apart a greater amount than is desired.

SUMMARY OF THE INVENTION

In accordance with an example of the invention, an array of photosensor pairs is arranged so that every individual photosensor is positioned equidistant from the two photosensors of one adjacent pair of photosensors. Therefore, light intended for the individual photosensor which spills over to the adjacent pair is cancelled as common mode noise. Also, light intended for the pair of photosensors which spills over to the individual photosensor is balanced by spillover to the other photosensor of the pair of light intended for another pair of photosensors.

DESCRIPTION OF PREFERRED EMBODIMENT

Figure 1:
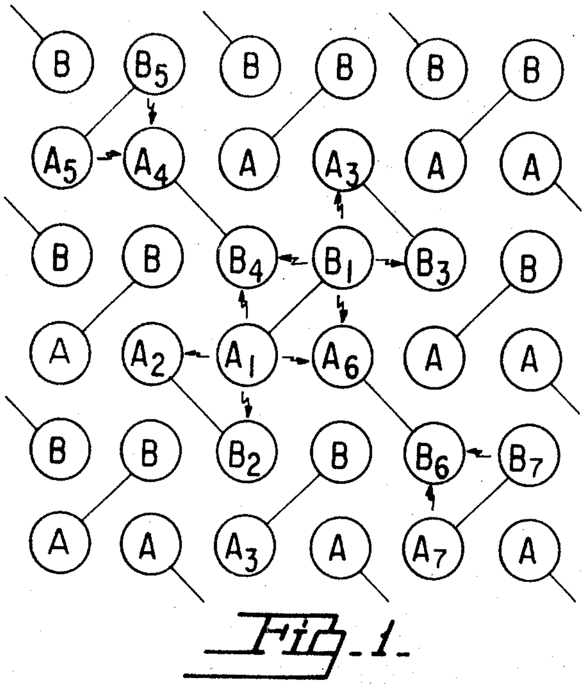
FIG. 1 is a diagram of photosensor pairs each connected to a bistable circuit and arranged so that the effect of light intended for an individual photosensor which spreads out to an adjacent photosensor is cancelled.
Figure 3:
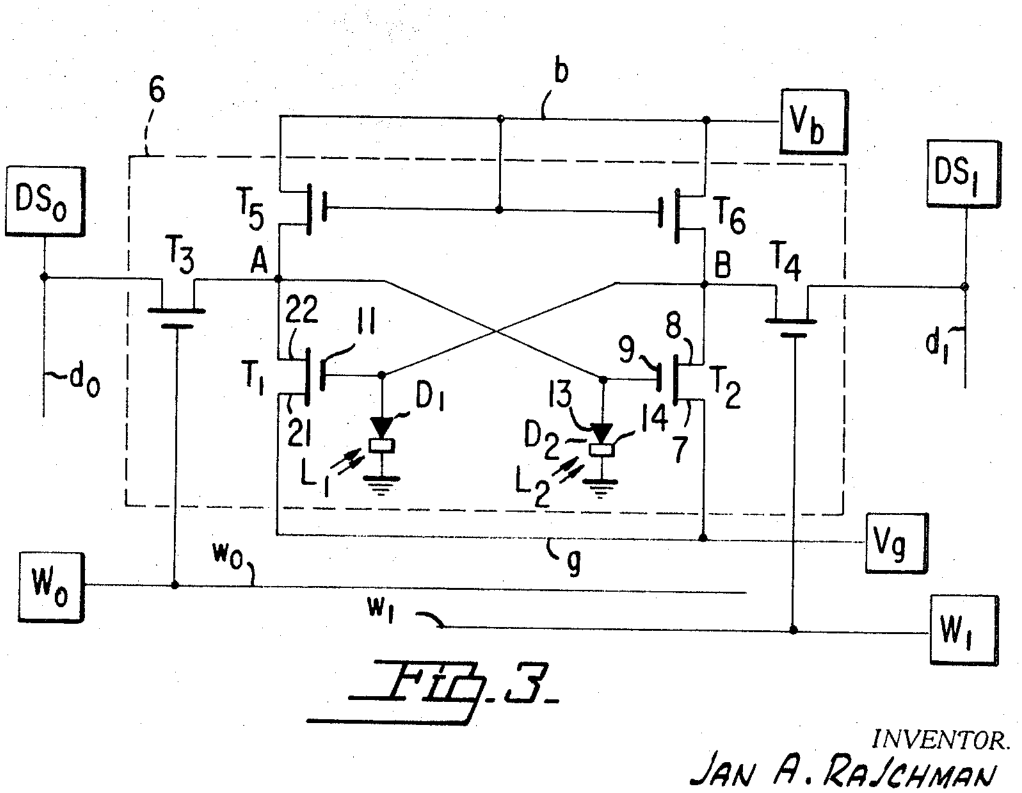
FIG. 3 is a circuit diagram of a bistable circuit including photosensor diodes by which the circuit is optically settable to a 1 or a 0 state.
Figure 4:
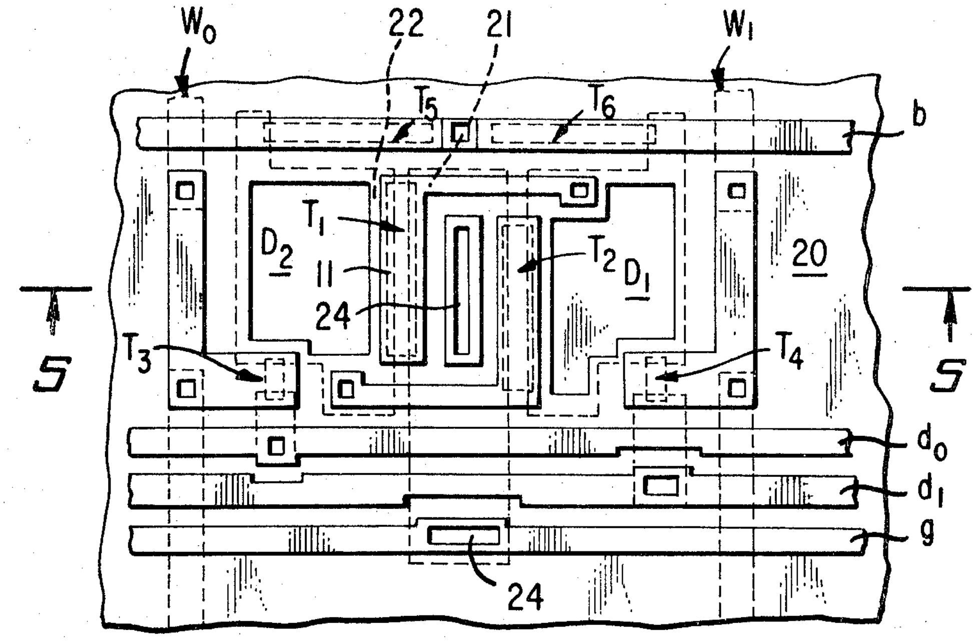
FIG. 4 is a plan view of an integrated circuit embodiment of the circuit of FIG. 3.
Figure 5:
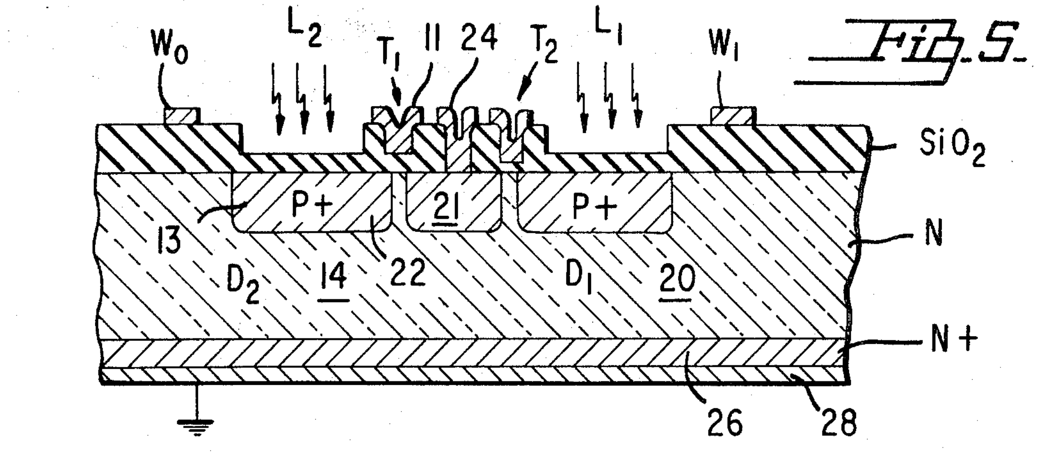
FIG. 5 is a sectional view taken on the line 5—5 of FIG. 4.

Reference is now made to FIG. 1 for a description of a physical arrangement of memory elements each including a bistable circuit and a pair of spaced photosensors. The photosensors are represented by circles. The two photo-sensors of each pair are connected by a diagonal line which represents a corresponding bistable semiconductor circuit. Therefore, each "dumbbell" symbol represents an optically settable bistable memory element such as is illustrated in FIGS. 3, 4 and 5.

In FIG. 1 the individual photosensors are arranged in a rectangular area of rows and columns. The photosensors in alternate rows are designated B, and the photosensors in intermediate rows are designated A. Each photosensor pair includes a photosensor A and a photosensor B connected by a diagonal line representing the bistable circuit. Each photosensor A forms a pair with a photosensor B which is located in a next adjacent row and a next adjacent column.

The arrangement of photosensor pairs may be described as one in which the pairs are arranged in an interlaced herringbone fashion. Each photosensor is positioned equidistnat from the two photosensors of one adjacent pair. That is, photosensor $A_1$ is located equidistant from photosensor $A_2$ and $B_2$ of the adjacent pair. Similarly, photosensor $B_1$ is located equidistant from the photosensors $A_3$ and $B_3$ of the adjacent pair. The same can be said about the location of every individual photosensor in relation to an adjacent pair of photosensors. However, a special situation exists at the peripheral edges of the array. That is, the photosensors located at the edges of the array do not receive balancing spill light from all sides. This problem can be solved by directing illumination to spots around the periphery of the array at locations where adjacent photosensors would otherwise be.

Figure 6:
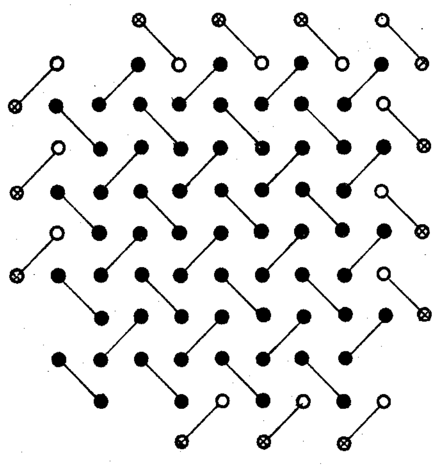
FIG. 6 is a diagram which will be referred to in explaining how to avoid edge effects in the array.

FIG. 6 illustrates a four-by-four array of photosensor pairs in which the information-receptive photosensor pairs are shown by solid dots connected by solid lines. The positions of absent pairs around the periphery, which are needed for balancing purposes, are shown by open circles connected by lines. The information pairs are balanced if one side of each peripheral pair (such as the sides marked with an "*x*") are illuminated with light of signal intensity from any source. The source (not shown) from which information light is directed to the photosensor array may include means to project light to the locations marked "*x*".

If the memory system is one as described in *Applied Optics*, supra, in which each memory element includes, not only a pair of photosensors and a semiconductor bistable circuit, but also a pair of light valves in registry with the photosensors, then the array of memory elements may include the peripheral memory elements shown in FIG. 6 with the bistable circuit of each element fixed permanently in one state, such as the state in which the light valves at positions marked "*x*" are permanently "open". Then the fixed states of the peripheral memory elements are recorded along with the information bearing states of the interior memory elements on the electro-optical manganese bismuth recording medium (not shown), and the optical signals reproduced from the recording medium illuminate the array of FIG. 6 in such a way as to provide light balancing effects at all information-receptive memory elements.

Figure 2:
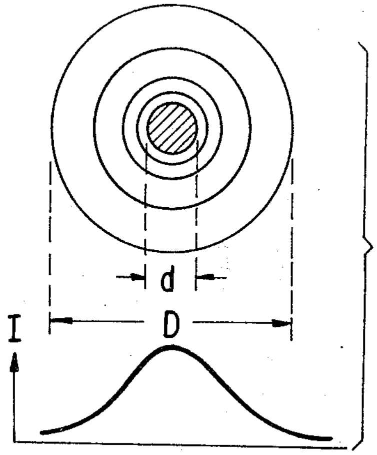
FIG. 2 is a diagram illustrating the undesired spreading out of an incident information signal light spot.

Reference is now made to FIG. 2 for a description of the nature of the input light signals impinging on each of the photosensors in the area of FIG. 1. The size of the original light spot which is recorded on a holographic storage medium in the mass memory system may be as represented by the shaded circle having diameter *d*. When the graphically recorded information is read out from the storage medium and directed to one of the photosensors shown in FIG. 1, the light distribution may have an intensity distribution I such that an appreciable amount of light spills over or extends out within the area of a circle having diameter D. Therefore, the light intended for one photosensor may extend to, and adversely affect, an adjacent photosensor.

While the effect of the diffusion or enlargement of the light spot signal can be overcome by placing the photosensors sufficiently far apart, doing so is disadvantageous because it reduces the bit storage density attainable on the holographic storage medium. The bit storage density attainable on the holographic storage medium is proportional to the square of the ratio of the bit spot diameter to the bit-to-bit spacing of the light valves through which light is projected to create the holograms on the holographic storage medium. Increasing the bit-to-bit spacing decreases the bit storage density. The array of photosensors must have the same proportions as the array of light valves. Therefore, close bit-to-bit spacing in the system is attainable when the array of photosensors is arranged as shown in FIG. 1 so that the effect of light intended for a given photosensor which spills over to an adjacent photosensor does not adversely effect the semiconductor bistable memory element connected to the adjacent photosensor.

Reference is now made to FIGS. 3, 4 and 5 for a description of an exemplary semiconductor memory element including a bistable flip-flop circuit and including two photosensors for use as each "dumbbell" symbol in FIG. 1. FIG. 3 is a circuit diagram of an electrically and optically settable bistable circuit or flip-flop. Each dumbbell in FIG. 1 may be constituted by the portion of FIG. 3 enclosed in the dashed box 6. The remainder of FIG. 3 is common to the entire array of FIG. 1. The flip-flop portion of the circuit includes cross-coupled transistors $T_1$ and $T_2$, and load impedance transistors $T_5$ and $T_6$ for the transistors $T_1$ and $T_2$, respectively. The load impedance transistors $T_5$ and $T_6$ are connected to a switchable source $V_b$ of bias potential capable of supplying either a −V bias potential or a reference or ground potential. The transistors $T_1$, $T_2$, $T_5$ and $T_6$ are illustrated as P-type MOS (metal oxide semiconductor) insulated gate field-effect transistors (IGFETS). Each transistor includes, as shown in relation to transistor $T_2$, a source 7, a drain 8, and a gate electrode 9. The described circuit including transistors $T_1$, $T_2$, $T_5$ and $T_6$ constitutes a known bistable circuit or flip-flop.

The flip-flop is shown connected as one memory cell in an array of memory cells which includes means for electrically writing an information bit into the memory cell and reading out an information bit from the memory cell. The accessing means includes a digit drive and sense circuit $DS_0$ connected to a digit column line $d_0$, and a digit driver and sense circuit $DS_1$ connected to a digit column line $d_1$. The accessing means also includes a word driver $W_0$ connected to a word row line $w_0$, and a word driver $W_1$ connected to a word row line $w_1$. Separate word lines $w_0$ and $w_1$ are shown in FIG. 3 because they may be needed to ensure geometrical symmetry in the actual circuit layout, such as the layout shown in FIG. 4. Otherwise, a single word driver and a single word line may replace drivers $W_0$ and $W_1$ and word lines $w_0$ and $w_1$.

The digit line $d_0$ is coupled through a gate transistor $T_3$ to the drain 22 or output A of transistor $T_1$, and to the gate electrode 9 of transistor $T_2$. The gate transistor $T_3$ is enabled by a signal applied to the gate electrode thereof from the word line $w_0$. The digit line $d_1$ is coupled through a gate transistor $T_4$ to the drain 8 or output B of transistor $T_2$ and to the gate electrode 11 of transistor $T_1$. Gate transistor $T_4$ is enabled by a signal from the word line $w_1$.

The circuit of FIG. 3 also includes a photosensor in the form of a PN photodiode $D_2$ having one side, an anode 13, connected to the drain 22 or output A of transistor $T_1$, and to the gate 9 of transistor $T_2$. The diode $D_2$ has another side or cathode 14 connected to a point of reference potential which is the bulk silicon substrate of transistor $T_1$. When the circuit is built in integrated form, the bulk silicon substrate is common also to transistors $T_2$ through $T_6$. A second photodiode $D_1$ has an anode connected to the drain 8 of transistor $T_2$ and to the gate electrode of transistor $T_1$.

FIGS. 4 and 5 show a physical construction of the electrically and optically settable memory element shown in circuit diagram form in FIG. 3. The circuit is constructed on an N-type silicon substrate 20 in which regions of P+ silicon are formed to serve as source and drain elements of the transistors. The P+ regions and the regions therebetween are covered with a layer of silicon dioxide, $SiO_2$, to provide electrical insulation. Conductive gate electrodes are formed over the insulated regions between respective sources and drains. Electrical conductors, formed on the silicon dioxide layer, include contact regions, such as 24, extending through openings in the silicon dioxide layer to the P+ regions below.

The transistors $T_1$ through $T_6$ shown in FIG. 3 are indicated in FIG. 4 by the same respective designations $T_1$ through $T_6$. The transistor $T_1$ is seen from FIGS. 4 and 5 to include a P+ type source 21 separated from a P+ type drain 22. A thin silicon dioxide layer overlying the area between the source 21 and the drain 22 forms an insulating region over which is positioned a conductive gate electrode 11. The digit conductor lines $d_0$ and $d_1$ are shown on top of the silicon dioxide layer. A ground line g is shown on the silicon dioxide layer with a contact region 24 extending through the silicon dioxide layer to make electrical contact with the P+ material forming the source 21 of transistor $T_1$. The construction of gate transistors $T_3$ and $T_4$, and load impedance transistors $T_5$ and $T_6$, are also shown in FIG. 4.

Transistors $T_1$ and $T_2$ are made large and of low impedance relative to gate transistors $T_3$ and $T_4$, which, in turn, are large and of low impedance relative to load impedance transistors $T_5$ and $T_6$. The size of an MOS transistor is determined by the ratio of the width of the channel to the length of the channel. In accordance with these design considerations, the transistors $T_1$ and $T_2$ in FIG. 4 are seen to have channels which are reatively wide and short in length. Transistors $T_3$ and $T_4$, on the other hand, have channels that are relatively narrow and long.

The drain 22 of transistor $T_1$ is shown in FIGS. 4 and 5 to be a P+ material which is extended along the N-type substrate 20 to be relatively large rectangular area to form the phtotodiode $D_2$. The P+ material in this area forms the anode 13 of the photodiode $D_2$, and the N-type substrate material 20 forms the cathode 14 of the photodiode D. The large surface of the P+ material forming the photodiode $D_2$ is covered with a thin layer of silicon dioxide having a thickness equal to about one-fourth the wavelength of the light signal $L_2$, so that reflections of the light signal at the surface of the silicon are minimized. The photodiode $D_1$ is similarly constructed in relation to transistor $T_2$ to be symmetrical with photodiode $D_2$ and transistor $T_1$.

To complete the structual description, the bottom surface of the N-type silicon 20 may be provided with a thin N+ layer 26 on which is formed a metal ground layer 28. The metal ground layer 28 is externally connected to the ground conductor g on the top surface of the integrated circuit. Since the construction of MOS integrated circuits is generally known, it is not necessary to describe the construction shown in FIGS. 4 and 5 in greater detail.

OPERATION

In the operation of the arrangement shown in FIG. 1, the digital light signal impinging on a pair of photosensors is such that light is directed to a photosensor A when the binary information conveyed is a 1, and light is directed to the photosensor B of the pair when the binary information conveyed is a 0. The bistable circuit controlled by the respective pair of photosensors is responsive in a differential fashion to the photosensors to store either a 1 or a 0. That is, the circuit is set to a 1 state when the light impinging on the photosensor A is greater than the light impinging on the photosensor B of the pair. Therefore, the memory element effectively cancels the common mode input light signal constituted by the equal quantities of light that may fall on both photosensors of a pair.

Light intended for photosensor $A_1$ may also include diffused light which extends to and impinges on the photosensors of the adjacent pair $A_2$ and $B_2$. Since this light equally affects photosensors $A_2$ and $B_2$, the effect of the spill light is cancelled in the memory element including photosensors $A_2$ and $B_2$. In a similar way, light intended for photosensor $B_1$ which spills over to photosensors $A_3$ and $B_3$ is cancelled in the circuits of the corresponding memory element.

The arrangement of photosensors shown in FIG. 1 provides an additional degree of cancellation of spill light. That is, light intended for photosensor $A_1$, and light intended for photosensor $B_1$, spill over and reach photosensor $B_4$. The amount of light thus reaching photosensor $B_4$ is constant because either photosensor $A_1$ or photosensor $B_1$ is illuminated to represent a 1 or a 0. The amount of light intended for photosensors $A_1$ or $B_1$ which spills over and reaches photosensor $B_4$ is balanced by the light intended for photosensors $A_5$ or $B_5$ which spills over and reaches photosensor $A_4$. It is therefore seen that the memory element including photosensors $A_4$ and $B_4$ receive equal amounts of spill light which are cancelled in the bistable circuit associated with the photosensors $A_4$ and $B_4$.

What has been said about the cancellation of spill light in relation to the photosensors $A_1$, $B_1$ through $A_5$, $B_5$ applies also to all the photosensors in the array. It is therefore seen that the arrangement shown in FIG. 1 permits the memory elements to be densely packed for the storage of a large amount of digital information while preventing light intended for a particular photosensor from adversely affecting adjacent photosensors.

What is claimed is:

1. An array of pairs of photosensors, and a differential circuit connected to each pair of photosensors, so that the photosensors of each pair are responsive to a respective differential light signal, the pairs of photosensors being arranged in the array so that every individual photosensor is positioned equidistant from the two photosensors of one adjacent pair of photosensors.

2. The combination as defined in claim 1 wherein said individual photosensors are arranged in rows and columns, and wherein the two individual photosensors of each pair of photosensors are in different adjacent rows and columns.

3. The combination as defined in claim 1 whereby half of the photosensor pairs are aligned with one diagonal, and the other half are aligned with the other diagonal.

4. An array as defined in claim 3 wherein each photosensor pair is aligned with a given diagonal and is surrounded by four photosensor pairs each aligned with the other diagonal.

5. An array of memory elements each including a bistable circuit having a differential input circuit including a pair of spaced photosensors, so that the bistable circuit is set to one or the other of its two stable states in accordance with which photosensor of the pair receives the greater amount of input light, the pairs of photosensors being arranged in interlaced herringbone fashion in the array so that every photosensor of a pair is positioned equidistant from the two photosensors of one adjacent pair of photosensors, whereby the effect of input light intended for one photosensor of a pair which may spill over to the equidistant photosensors of the adjacent pair of photosensors is cancelled in the differential input circuit of the bistable circuit of the adjacent pair.

6. An array of pairs of photosensors, and a differential circuit connected to each pair of photosensors, said pairs of photosensors being arranged in interlaced herringbone fashion.

7. An array of photosensors as defined in claim 6 wherein every photosensor of a pair is positioned equidistant from the two photosensors of one adjacent pair of photosensors.

* * * * *